(12) United States Patent
Bosman et al.

(10) Patent No.: US 10,072,757 B2
(45) Date of Patent: Sep. 11, 2018

(54) REINFORCING MEMBER AND AN ARTICLE, SUCH AS A PRESSURE VESSEL, CONTAINING THE REINFORCING MEMBER

(75) Inventors: Rigobert Bosman, Landgraaf (NL); Roelof Marissen, Born (NL)

(73) Assignee: DSM IP ASSETS B.V., Heerlen (NL)

( * ) Notice: Subject to any disclaimer, the term of this patent is extended or adjusted under 35 U.S.C. 154(b) by 842 days.

(21) Appl. No.: 13/001,523

(22) PCT Filed: Jun. 24, 2009

(86) PCT No.: PCT/EP2009/004564
§ 371 (c)(1),
(2), (4) Date: Mar. 11, 2011

(87) PCT Pub. No.: WO2009/156142
PCT Pub. Date: Dec. 30, 2009

(65) Prior Publication Data
US 2011/0266290 A1    Nov. 3, 2011

(30) Foreign Application Priority Data
Jun. 24, 2008  (EP) ..................................... 08011395

(51) Int. Cl.
*F16J 12/00* (2006.01)
(52) U.S. Cl.
CPC ..................... *F16J 12/00* (2013.01)
(58) Field of Classification Search
CPC ............................ D02G 3/447; Y10T 428/139
USPC .................................. 220/589, 588, 586, 581
See application file for complete search history.

(56) References Cited

U.S. PATENT DOCUMENTS

| 6,508,276 | B2* | 1/2003 | Radlinger et al. ............ 138/125 |
| 7,086,553 | B2  | 8/2006 | Debecker et al. |
| 7,178,323 | B2* | 2/2007 | Kolmes et al. ................ 57/210 |
| 7,214,425 | B2* | 5/2007 | Kolmes et al. ............... 428/357 |
| 2005/0260373 | A1* | 11/2005 | DeLay et al. ................ 428/36.4 |

(Continued)

FOREIGN PATENT DOCUMENTS

| DE | 103 45 159 | 2/2005 |
| DE | 10 2006 043582 | 3/2008 |

(Continued)

OTHER PUBLICATIONS

International Search Report for PCT/EP2009/004564, dated Aug. 27, 2009.

(Continued)

*Primary Examiner* — Anthony Stashick
*Assistant Examiner* — Blaine Neway
(74) *Attorney, Agent, or Firm* — Nixon & Vanderhye P.C.

(57) ABSTRACT

The invention relates to a reinforcing liner comprising load-bearing yarns of a first type characterized in that the liner further comprises load-bearing yarns of a second type having a creep rate $\dot{\varepsilon}_2$ of at least 10 times higher than the creep rate $\dot{\varepsilon}_1$ of the yarns of first type, i.e. $\dot{\varepsilon}_2 \geq 10 \times \dot{\varepsilon}_1$, wherein the creep rates are measured on the yarns at a temperature of 20° C. and under an applied load of 600 MPa. The invention also relates to a pressure vessel comprising thereof.

17 Claims, 3 Drawing Sheets

(56) References Cited

U.S. PATENT DOCUMENTS

2006/0151656 A1* 7/2006 Gallagher ........... F16L 55/1652
                                                       242/437
2009/0051181 A1* 2/2009 Goossens et al. .............. 294/74
2009/0314785 A1* 12/2009 Cronin et al. ................ 220/590
2010/0286728 A1* 11/2010 Simmelink et al. .......... 606/228

FOREIGN PATENT DOCUMENTS

EP          0 666 450       8/1995
WO         WO 97/12175      4/1997

OTHER PUBLICATIONS

Vlasblom et al; *Predicting the Creep Lifetime of HMPE Mooring Rope Applications*, IEEE, 1-4244-0115-1 (2006).

* cited by examiner

REINFORCING MEMBER AND AN ARTICLE, SUCH AS A PRESSURE VESSEL, CONTAINING THE REINFORCING MEMBER

This application is the U.S. national phase of International Application No. PCT/EP2009/004564 filed 24 Jun. 2009, which designated the U.S. and claims priority to EP Application No. 08011395.4, filed 24 Jun. 2008, the entire contents of each of which are hereby incorporated by reference.

The invention relates to a reinforcing member for an article, such as a pressure vessel, the member comprising load-bearing yarns of a first type. The invention also relates to a pressure vessel comprising said member, preferably in a liner.

Pressure vessels reinforced with liners which comprise load-bearing yarns, hereinafter simply called yarns, are commonly used in applications dealing with the containment or conveying of fluid or gases. Known containment pressure vessels, as for example the one disclosed by U.S. Pat. No. 7,086,553, usually comprise a tight chamber to hold the pressurized gas or fluid, the chamber being overwound with reinforcing yarns. Known conveying pressure vessels, e.g. pipes, are known for example from U.S. Pat. No. 6,889,716 which discloses a pipe wrapped with a layer of reinforcing yarns of polyethylene or nylon.

It was found that the reinforcing liners of the known pressure vessels have a disadvantage which becomes apparent when the vessels are pressurized for an extended period of time to a working pressure. The working pressure exerts a load on the reinforced walls of the vessel said load being transmitted to the yarns contained by the reinforcing liner thereof. It happens often that besides the load acting on the reinforced walls of the vessel, sudden increases in said load, i.e. load peaks, may occur throughout the service life of the vessel. Such load peaks may be due to various external forces acting at least temporary on the vessel. For example, the load acting on the reinforced walls of a pressurized pipe laid on or under-ground may suddenly increase during an earthquake. The extra load that adds to the load exerted by the working pressure stems from the bending of the pipe caused by the violent shifting of the ground. Such a load peak often damages the yarns of the reinforcing liner and may ultimately lead to pipe failure.

A similar situation occurs when a pressurized containment vessel, e.g. a fluid- or gas-container, is transported on poorly maintained roads or even accidentally impacted. The sudden increases in the load acting on the container's reinforced walls may cause the rupturing of the yarns in the reinforcing liner and bursting of the container.

It was also noticed that the known pressure vessels have a decreased efficiency and moreover their efficiency decreases over time. Repetitive occurrences of load peaks induce damages in the yarns of the reinforcing liner, reducing the efficiency of the reinforcement thereof. Moreover, the moment when known pressure vessels are prone to fail or burst is difficult to predict, increasing therefore the safety hazard in particular when said vessels are subjected for an extended period of time to a working pressure close to the maximum allowed pressure.

It is the object of the present invention to provide a reinforcing member and a pressure vessel comprising thereof not having the above-mentioned disadvantages or having them to a lesser extent than known members, liners or pressure vessels.

The object of the invention was achieved with a reinforcing member comprising load-bearing yarns of a first type characterized in that the member further comprises load-bearing yarns of a second type having a creep rate $\dot{\varepsilon}_2$ of at least 10 times higher than the creep rate $\dot{\varepsilon}_1$ of the yarns of first type, i.e.

$$\dot{\varepsilon}_2 \geq 10 \times \dot{\varepsilon}_1$$

wherein the creep rates are measured on the yarns at a temperature of 20° C. and under an applied load of 600 MPa.

It was surprisingly found that a pressure vessel reinforced with the member of the invention has an improved durability and shows an increased service lifetime. In particular, when the vessel is used in applications where often increases in the working pressure occur, the reinforced pressure vessel presents an increased resistance to cumulative damages. Therefore, the moment of failure or burst of the pressure vessels reinforced with the member of the invention is largely postponed.

It was also surprisingly observed that the safety factor of the pressure vessels reinforced with the member of the invention is improved. Yet more surprising is that said safety factor improves with time. The inventors discovered that the more load peaks are occurring, the better the pressure vessel responds thereto. Without being bound to any explanations, the inventors attributed this effect to an optimization in the reinforcing behavior of the yarns contained by the inventive member.

The invention also relates to a pressure vessel comprising the inventive member. Preferably, the inventive pressure vessel is a containment or a conveying pressure vessel, and more preferably the member is a liner for the vessel, the liner preferably being used to either cover at least a part of the inner surface or the outer surface of the pressure vessel.

It was observed that the inventive pressure vessel shows an increased efficiency and needs less maintenance during its service life. Therefore, the overall maintenance costs needed for repairs or periodical inspections are decreased.

Preferably, the yarns of second type have a creep rate $\dot{\varepsilon}_2$ of at least 30 times higher than the creep rate $\dot{\varepsilon}_1$ of the yarns of first type, more preferably at least 100 times higher, most preferably at least 300 times higher. It was observed that the inventive vessel shows further increased resistance to cumulative damages the higher the difference in creep rates. In particular the higher the difference, the better the inventive member and the pressure vessel containing thereof respond to load peaks.

In a preferred embodiment of the invention, the yarns of second type have a creep rate $\dot{\varepsilon}_2$ of at least $10^{-9}$ sec$^{-1}$, more preferably at least $10^{-8}$ sec$^{-1}$, most preferably at least $10^{-7}$ sec$^{-1}$ and the yarns of first type have a creep rate $\dot{\varepsilon}_1$, insofar as the creep rate difference between $\dot{\varepsilon}_2$ and $\dot{\varepsilon}_1$ is met, of at most $10^{-10}$ sec$^{-1}$, more preferably at most $10^{-11}$ sec$^{-1}$, most preferably the yarns of first type do not creep with a measurable amount when measured under the conditions of temperature and load of the invention.

In a more preferred embodiment, said yarns of first type have a creep rate $\dot{\varepsilon}_1$ between $10^{-10}$ sec$^{-1}$ and $10^{-12}$ sec$^{-1}$ and said yarns of second type have a creep rate $\dot{\varepsilon}_2$ between $10^{-3}$ sec$^{-1}$ and $10^{-9}$ sec$^{-1}$.

The advantage of the above presented preferred embodiments is that besides the already mentioned advantages, a pressure vessel reinforced with a member comprising first and second type yarns having a difference in the creep rate according to said embodiments presents a further increased efficiency and safety factor.

The amount $m_1$ in mass % of the yarns of first type contained by the inventive member is preferably between 20% and 80%, more preferably between 40% and 60%, most preferably between 45% and 55% from the total mass of load-bearing yarns, as computed according to Formula 1:

$$m_1 = \frac{M_1}{M_1 + M_2} \times 100 \text{ (mass \%)} \quad \text{Formula 1}$$

wherein $M_1$ and $M_2$ are the masses of the yarn of first and second type, respectively, contained by the inventive member.

Preferably, the ratio $F_1/F_2$ of the fracture strains of the yarns of first type $F_1$ and of second type $F_2$ is between 1.1 and 6, more preferably between 1.2 and 4, most preferably between 1.3 and 3. In other words, the yarns of the second type would fail at a lower strain than yarns of the first type. It was found that a pressure vessel reinforced with a member comprising such yarns presents a further increased durability and even further increased resistance to cumulative damages.

Preferably, the yarns of first and second type have a tensile strength of at least 1.2 GPa, more preferably at least 2 GPa, even more preferably at least 3 GPa, most preferably at least 3.5 GPa. For fixed amounts of yarns of first and second type, it was surprisingly found that even when the tensile strength of the yarns of first type is lower than that of the yarns of second type, the advantages of the invention are still present. Additionally, the costs of producing such a reinforced pressure vessel are reduced because part of the expensive high-strength yarns are replaced by cheaper, lower-strength yarns with little compromise with respect to the advantages provided by the invention.

In one embodiment, the reinforcement member comprises at least one further yarn of the first type and/or at least one further yarn of the second type. Such further yarns may for example be added to provide a range of steps leading to a gradual or multi-step effect to the system or such further yarns may be added to provide a discard criterion for the system, such as an optical or electrical conducting fibre, which at the time when the system should be discarded will exhibit a certain characteristic, such as increased electrical resistance or reduced (or no) optical transmission.

The titer of the yarns may vary within large limits depending by the application for which the pressure vessel is used. Preferably, said titer is at least 440 dtex, more preferably at least 880 dtex, most preferably at least 1760 dtex. The important advantage of using higher titer yarns is that they are cheaper to produce and faster to apply.

The yarns contained by the inventive member may be produced according to any technique known in the art, preferably by melt, solution or gel spinning techniques or solid state technique. The materials used to produce said yarns may be any material that can be processed into said yarns. Suitable examples of materials include polyamides and polyaramides, e.g. poly(p-phenylene terephthalamide) (for example Kevlar®) and aromatic copolyamide prepared from terephthaloyl chloride and equimolar proportions of p-phenylenediamine and 3,4'-diaminodiphenylether (for example Technora®); poly(tetrafluoroethylene) (PTFE); poly(p-phenylene-2,6-benzobisoxazole) (PBO) (for example Zylon®); LCP (copolymer of para hydroxybenzoic acid and para hydroxynapthalic acid) (for example Vectran®); poly{2,6-diimidazo-[4,5b-4",5"e]pyridinylene-1,4 (2,5-dihydroxy)phenylene (for example M5); poly(hexamethyleneadipamide) (known as nylon 6,6), poly(4-aminobutyric acid) (for example nylon 6); polyesters, e.g. poly(ethylene terephthalate), poly(butylene terephthalate), inorganic fibers (particularly glass fibers, such as S-glass based fibers) and poly(1,4 cyclohexylidene dimethylene terephthalate); polyolefins, e.g. homopolymers and copolymers of polyethylene and polypropylene; but also polyvinyl alcohols, polyacrylonitriles and the like as well as mixtures thereof. It is highly preferred that the materials used to produce said yarns are polymeric materials as polymeric materials typically allows for higher flexibility than inorganic based yarns. Particularly it is preferred that the second type of yarn is a polymeric material, as polymeric based yarns typically has a higher creep than inorganic based yarns.

In one embodiment, the first type yarn comprises an inorganic yarn, preferably the inorganic yarn is a glass fiber and more preferably the glass fiber is an S-glass fiber. This allows for a first type yarns with very low creep rate and hence allows for a broad range of choices for selecting the second type of yarns. Particularly preferred is the combination of the first type yarns comprising glass fibers and the second type yarn comprising a high performance polyethylene, such as gelspun UHMWPE.

The yarns of first type may be manufactured from a different or of the same type of material as the yarns of second type. However, when the same type of material is used to manufacture said yarns, the material must permit the manufacturing of yarns with different creep rates insofar the creep rate requirements according to the invention are met. An example of a suitable material for using in manufacturing both yarns of first and second type is polyolefin, more in particular ultrahigh molecular weight polyethylene (UHMWPE) or polypropylene. The polymeric material may for example differ in molecular weight, processing (leading to different structure, arrangement of the molecules, crystallinity, etc.), and/or specific chemistry (for example variation in side group density, chemical composition etc.).

In a preferred embodiment the yarns of second type, i.e. the yarns with higher creep rate, are manufactured from polyolefin, more preferably from UHMWPE. The yarns of first type to be used together with the yarns of second type of this embodiment are preferably yarns manufactured from materials chosen from the groups consisting of polyamides, polyaramides, polyesters and inorganic yarns. The advantage of a liner comprising the combination of yarns of this embodiment is that a pressure vessel or the article comprising the member has an improved efficiency and also an improved safety factor while having an increased durability.

In a further preferred embodiment of the invention, the yarns of first type are manufactured from aromatic copolyamides, most preferably said copolyamides being prepared from terephthaloyl chloride and equimolar proportions of p-phenylenediamine and 3,4'-diaminodiphenylether. The yarns of the second type of this embodiment are preferably manufactured from polyolefin, more preferably from UHMWPE. In addition to the advantages of the invention, a pressure vessel containing a reinforcing member comprising the first and second yarns of this embodiment also presents a decreased susceptibility to variations in the surrounding conditions. It was surprisingly found that the efficiency and/or the safety factor of said vessel show an improved resiliency to temperature variations. Moreover, said resiliency is present also when relatively often and/or large pressure increases occur, e.g. sudden increases in pressure up to more than about 110% of the working pressure.

Preferably the yarns used in the embodiments of the invention that are manufactured from UHMWPE are produced according to a so-called gel-spinning process as for example described in EP 0205960 A, EP 0213208 A1, U.S.

Pat. No. 4,413,110, GB 2042414 A, EP 0200547 B1, EP 0472114 B1, WO 01/73173 A1, and Advanced Fiber Spinning Technology, Ed. T. Nakajima, Woodhead Publ. Ltd (1994), ISBN 1-855-73182-7, and references cited therein, all incorporated herein by reference. When such yarns are used in the inventive member, it was observed that they are less or not it all damaged during the process of installing the member, in particular when the member is a is C-formed liner and it is inserted into a pipes.

Other important manufacturing method for producing high performance polyethylene (HPPE) are melt-spinning as for example described in EP1445356 and U.S. Pat. No. 5,234,652 and references cited therein, all incorporated herein by reference; solution-spinning; solid state technique as for example described in EP1627719 and references cited therein, incorporated herein by reference.

The construction of the inventive member may be any construction known in the art. The member may be stand-alone yarns, bundles of yarns or they may be captured in a fabric. If a fabric is used, said fabric may be of any construction known in the art, preferably woven or knitted, provided that at least part of the yarns within the fabric contributes to bearing the load, i.e. are load bearing yarns. The fabric may also comprise combinations of different yarns manufactured from the same of different material. The advantage of using a fabric is that the manufacturing process of the inventive reinforced article is simplified.

The inventive member may be applied on the outer surface of the walls of the pressure vessel or on the inner surface thereof and it may be positioned around the entire vessel or at least a portion thereof which is usually mostly affected by load peaks or exposed and prone to be accidentally impacted. This is particularly advantageous when the member is a liner. Preferably, the member is bonded thereto by known means, e.g. with adhesives, thermally bonded, and the like. The alignment of the load-bearing yarns contained by the member can vary with the particular shape of the pressure vessel. Thus a cylindrically shaped vessel can have one or more wraps of the load-bearing yarns in a loop or helical direction, whereas a spherical vessel can understandably be wrapped in different spatial directions. When the vessel has a cylindrical shape, e.g. when the vessel is a pipe, preferably the yarns are wrapped under an angle of between 30 and 60 degrees, more preferably at about 55 degrees assuming that 90 degrees is in the vessel's transverse direction and 0 degrees is in the vessel's axial direction. Examples of carrying out the yarns placement on the vessel's walls can employ external tension winding means to guide the reinforcing yarns while being wound around the outer surface of the vessel's walls. An alternative means for retaining the yarns alignment is a compaction roller to apply mechanical pressure to the yarns and to the inner or outer surface of the walls while bonding the yarns thereto, for example by using an adhesive or heat.

Depending on its construction, the inventive pressure vessel may comprise multiple walls, or a single tubular wall if said vessel is a pipe. The walls may be manufactured from a wide variety of thermoplastic or thermosetting polymers. Suitable examples of thermoplastic polymers include polyolefines such as polypropylene and polyethylene, e.g. high and medium density polyethylene; polyphenilene sulfide, polyetherketone, polyamide, polyamideimide, polyvinylidene difluoride and other known polymers known in the art. Suitable examples of thermosetting polymers include epoxy resins, vinyl ester resins, polyester resins and phenolic resins.

The inventive pressure vessel may be manufactured according to known methods in the art. Such a method is for example disclosed in U.S. Pat. No. 7,086,553 incorporated herein by reference. Further disclosures of methods of manufacturing pressure vessels comprising reinforcing liners are known from U.S. Pat. No. 5,931,198; U.S. Pat. No. 6,889,716; U.S. Pat. No. 4,330,881; U.S. Pat. No. 6,773,773; U.S. Pat. No. 6,839,604 and U.S. Pat. No. 5,647,503, incorporated herein by reference.

In the most preferred embodiment of the invention, the inventive pressure vessel is reinforced with a member forming a liner comprising load-bearing yarns of first and second type, wherein the yarns of second type were allowed to elongate by creep under a stress induced by a deformation of the walls of the vessel, said deformation being achieved by pressurizing the vessel at a pressure of at most the pressure at which the strain induced in the yarns of first type is about equal to the fracture strain of the yarns of first type. Preferably, the pressure vessel of this embodiment is conveying pressure vessel, more preferably a pipe. Preferably, the yarns of first type of this embodiment are manufactured from a material chosen from the group consisting of polyamides, polyaramides, polyesters and inorganic fibers, the advantage thereof being that such yarns do not creep under the applied stress or they creep with an un-measurable low or an insignificant amount. More preferably, the yarns of first type are manufactured of aromatic copolyamides, most preferably said copolyamides being prepared from terephthaloyl chloride and equimolar proportions of p-phenylenediamine and 3,4'-diaminodiphenylether. Preferably, the yarns of second type of this embodiment are manufactured from polyolefins, most preferably from UHMWPE.

It was surprisingly found that the pressure vessel of the most preferred embodiment of the invention shows all the advantages mentioned above and furthermore, a further improved safety factor. The advantages of this embodiment are even more surprising as they overcome a technical prejudice in the art. This applies in particular to pressurized vessels utilized for an extended period of time for heavy duty applications, e.g. highly-pressurized pipes, high pressure gas containers and the like. For such highly demanding applications, the use of yarns with a high creep rate to reinforce said vessel was consistently avoided. The common belief is that when used for extended periods of time, due to their enhanced creep behavior, these yarns lead to an accumulation of damages and to a gradual failure of the reinforced article. The present invention overcomes this prejudice and demonstrates the contrary.

By allowing the yarns of second type to elongate by creep is herein understood that said yarns undergo a permanent elongation under the combined effects of stress, time and working temperature. According to the most preferred embodiment of the invention, the stress is induced by a deformation of the vessel's walls reinforced with a liner comprising said yarns. The deformation of the walls of the vessel is due to the pressure to which the vessel is subjected. A typical exemplification thereof is the deformation of a thermoplastic pipe when an internal pressure is applied on said pipe. As soon as the pipe is pressurized its diameter increases due to the internal fluid or gas pressure pushing the walls of the pipe outwards. Both the reinforcing yarns and the thermoplastic walls of the pipe compete against the increase in said diameter and consequently a stress is induced thereof, i.e. in both the reinforcing yarns and said walls. The stress acting on the yarns is shared between the yarns of first and second type. It can be readily appreciated that a containment pressure vessel, e.g. a pressurized gas or fluid container, undergo similar effects when being under pressure, the walls thereof being deformed under the internal pressure exercised by the gas of fluid therein.

The pressure at which the strain induced in the yarns of first type is about equal with the fracture strain of the yarns of first type is understood as the pressure at which the yarns of first type begin to break, more in particular the pressure at which about 5 mass % of the yarns of first type from the total mass amount of said yarns of first type break. This pressure can be easily established with a very simple experiment wherein a test vessel of the invention is pressurized at increasingly higher pressures until it is observed that the first yarns begin to break. The broken yarns can be easily determined optically following a visual inspection, or with the help of a microscope or with X-Rays as known in the art.

In one embodiment, the member further comprises a resin. The member may for example be partially or completely by a thermosetting resin followed by curing of the resin. The resin may for example improve coherence between the yarns of the first type and the yarns of the second type and/or prevent leakage of a fluid through the member for example if the member is used as (part of) a container, such as a pipe. Preferably, the resin is a low temperature cure resin, which cures at a temperature below 100° C., more preferably the resin cures at a temperature below 70° C.

In a highly preferred embodiment, is the member a liner. This facilitates faster installation and improves handleability of the member, particularly when the member is used to reinforce a pressure vessel, such as a pipe, or when the member is used to reinforce a rope for example in a rope cover.

In one preferred embodiment, the member according to the invention is used to reinforce (also referred to as refurbish) an existing pipe line. This may for example be done by providing the member in a liner and collapse the liner to form a C-shape to facilitate installation of the liner into a pipe. In this case, it is preferred that the liner prevents or at least reduces the transport of fluid through it. This may for example be realized by including a (cured) resin film in the liner. Such a system allows for extended lifetime for the refurbished pipe and hence often provides an affordable and environmentally attractive alternative to replacement of the whole or a segment of the pipe.

In another embodiment, the member is used for reinforcing a new pipe. In this case, the member may be provided on the inner surface of the pipe, on the outer surface of the pipe or integrated in the main pipe structure. If arranged at a surface of the pipe, it is preferred to arrange the member on the outer surface of the pipe, as the member then does not need to prevent transport through the member to effectively reinforce the pipe (this is done by the main part of the pipe itself).

In one embodiment, the member according to the invention is used for increasing the efficiency of an article to above 100%. This is preferably done during the normal use of the article that is below the initial bursting strength (pressure or force) of the article. During the normal use of the article, the non creeping yarn (first type of yarn) will carry the load and if the member should be exposed to a high peak tension, the high creep yarn (second type of yarn) will provide extra strength to withhold the peak.

The skilled person knows how to determine whether the yarns of second type are elongated by creep. By depressurizing the vessel, the skilled person can determine whether the yarns of second type were elongated by creep from the characteristic stress-strain diagram of the vessel. Such a diagram is recorded according to known methods in the art. Further details are given in the METHODS section hereof.

By load bearing yarns are herein understood yarns that contribute to the reinforcement of the pressure vessel, i.e. contribute to bearing the load acting on the vessel's walls, at least during part of the service lifetime of the vessel.

By fluid is herein understood any material or substance that changes shape or direction uniformly in response to an external force imposed on it and includes not only liquids and gasses but also finely divided solids and multi phase materials where at least one of the phases is a fluid.

By working pressure is herein understood the pressure to which the vessel of the invention is subjected during usage. The working pressure varies with the application wherein said vessel is used. Working pressure is also referred to as maximum design pressure.

By durability is herein understood the period of time over which safe operation of the pressure vessel is possible when used in its normal usage environment. Durability depends on the environment conditions like temperature, amount of UV radiation, humidity, pH, corrosion, mechanical stresses and the like.

By safety factor is herein understood the ratio between the burst pressure and the maximum design pressure for which the vessel of the invention was designed.

By efficiency is herein understood the ratio between the bursting pressure after certain time (t) of use and the initial bursting pressure at t=0.

Within the context of the present invention a yarn is understood to be an elongated body comprising at least one filament and preferably a plurality of individual filaments. The filaments are understood to be continuous filaments that are being of virtually indefinite length having cross-sectional dimensions much smaller than their length. The filaments may have cross-sections of various geometrical or irregular shapes, for example a tape-like (flat or flattened) cross-section, a (substantially) circular cross-section or a kidney-shaped cross-section. Filaments within the yarn may be parallel or entangled to one another; the yarn may be linear, twisted or otherwise departed from a linear configuration. Preferably, the yarns have a linear configuration, the advantage thereof being an improved load distribution between the filaments.

It was observed that all of the above mentioned advantages, in particular an increase of the efficiency over time, are present also in other articles like for example a rope, a sling, a suture, a cable, a chain construction, a liner or a composite comprising load-bearing yarns of a first type and load-bearing yarns of a second type having a creep rate $\dot{\varepsilon}_2$ of at least 10 times higher than the creep rate $\dot{\varepsilon}_1$ of the yarns of first type, i.e.

$$\dot{\varepsilon}_2 \geq 10 \times \dot{\varepsilon}_1$$

wherein the creep rates are measured on the yarns at a temperature of 20° C. and under an applied load of 600 MPa. Therefore, the invention also relates to such articles, particularly where spikes of force or tension may occur, such as the tension in a sling when an item to be lifted tilt or falls over and edge before the sling is tight or in a suture when a limp connected to a muscle or a sinew by the suture takes a sudden impact for example during an accident.

Hereinafter the figures are explained.

TEST EQUIPMENT AND METHODS

The strain induced in the load-bearing yarns by the load exerted by the working pressure to which the pressure vessel is subjected was determined with common strain gauges mounted in both radial and longitudinal direction on the walls of the vessel. Such strain gauges are commercially available.

Figure 1:
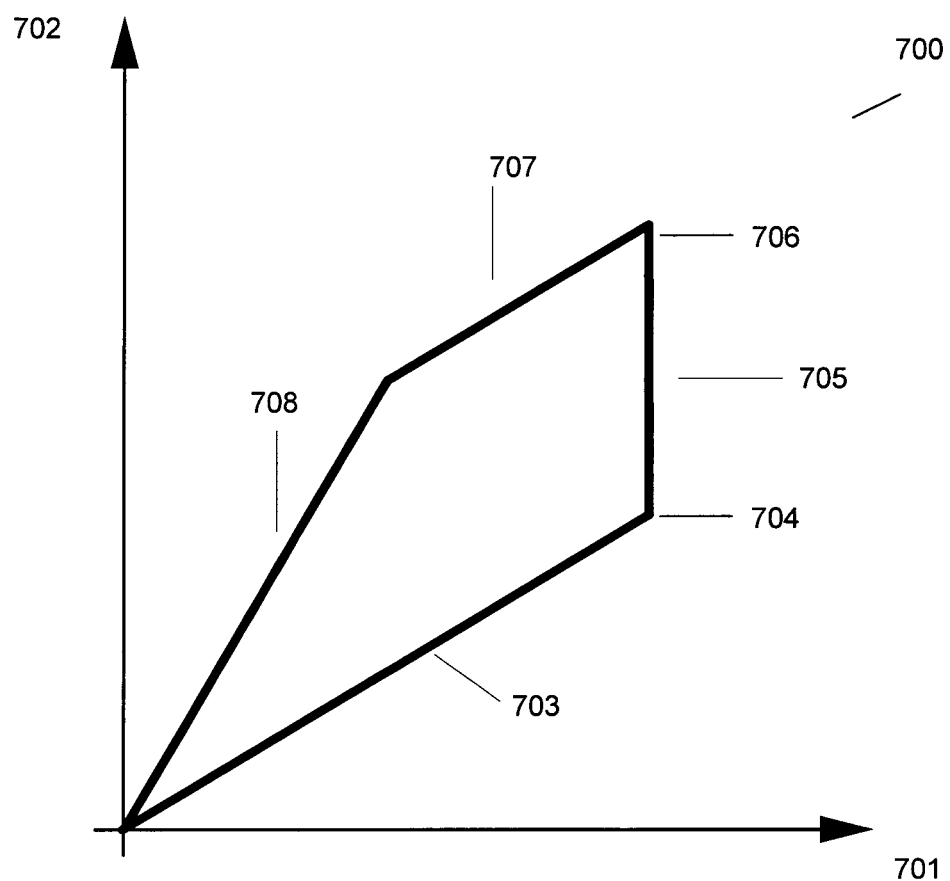
FIG. 1 represents a strain vs. pressure (strain-pressure) diagram of a pressurized vessel.

Stress-strain (or pressure-strain) diagram of the pressurized vessel was recorded by pressurizing the heated vessel at 70° C. to about 20% of the initial bursting pressure at a pressure rate such that the mentioned pressure is reached in about 2 minutes, and then keeping that pressure for 1 month. The pressure is then released with the same rate used as when it was applied. The strain induced in the vessel by pressurization was measured with strain gauges. A schematic representation of the recorded diagram (700) of the measured strain (702) vs. the applied pressure (701) is shown in FIG. 1. During the 2 minutes of initial pressure application, a linear increase (703) in strain with pressure was observed. Following stopping the application of the pressure (704) and during keeping the vessel for 1 month at 70° C. to the applied pressure, a strain increase at constant pressure (705) was measured by the strain gauges. After 1 month (706) of keeping the vessel under pressure, the pressure was released over 2 minutes and during the depressurization of the vessel, the strain decreased linear with the pressure in two stages. A first stage (707) where the decrease is almost parallel with the initial increase (703), which shows that both types of yarns under tension were released; and a second stage (708) where the decrease is faster, which shows that the second type of yarns (the high creep yarn) was no longer under tension and only the tension of the first type of yarns under tension was released. The proof that the type 2 yarns were elongated by creep is the presence of part (705) in the diagram wherein the strain increases at constant pressure.

Fracture strain of yarns was determined in about 2 minutes according to the commonly known and used ISO-2062.

The initial bursting pressure of a pressure vessel was measured by pressurizing the vessel at yet higher pressures in about 2 minutes until the vessel fractured releasing the pressure. The pressure at the moment of fracturing was considered as the bursting pressure.

The bursting pressure after a certain time (usually and in the following examples 1 month) of the pressure vessel was measured at an elevated temperature (70° C.) by pressurizing the vessel for the certain time (usually 1 month) and then rapidly increasing the pressure until the vessel fractured releasing the pressure. The efficiency was calculated as the ratio between the bursting pressure after the certain time and the initial bursting pressure. Hence, an efficiency of 100% means that the bursting pressure after one month at a pressure of 20% of the initial bursting pressure is the same as the initial bursting pressure. An efficiency of more than 100% means that the bursting pressure has increased after one month at a pressure of 20% of the initial bursting pressure, and an efficiency of less than 100% (which is the expected result) means that the bursting pressure has decreased after one month at a pressure of 20% of the initial bursting pressure.

Creep rate was measured according to the methodology described hereinafter.

Figure 2:
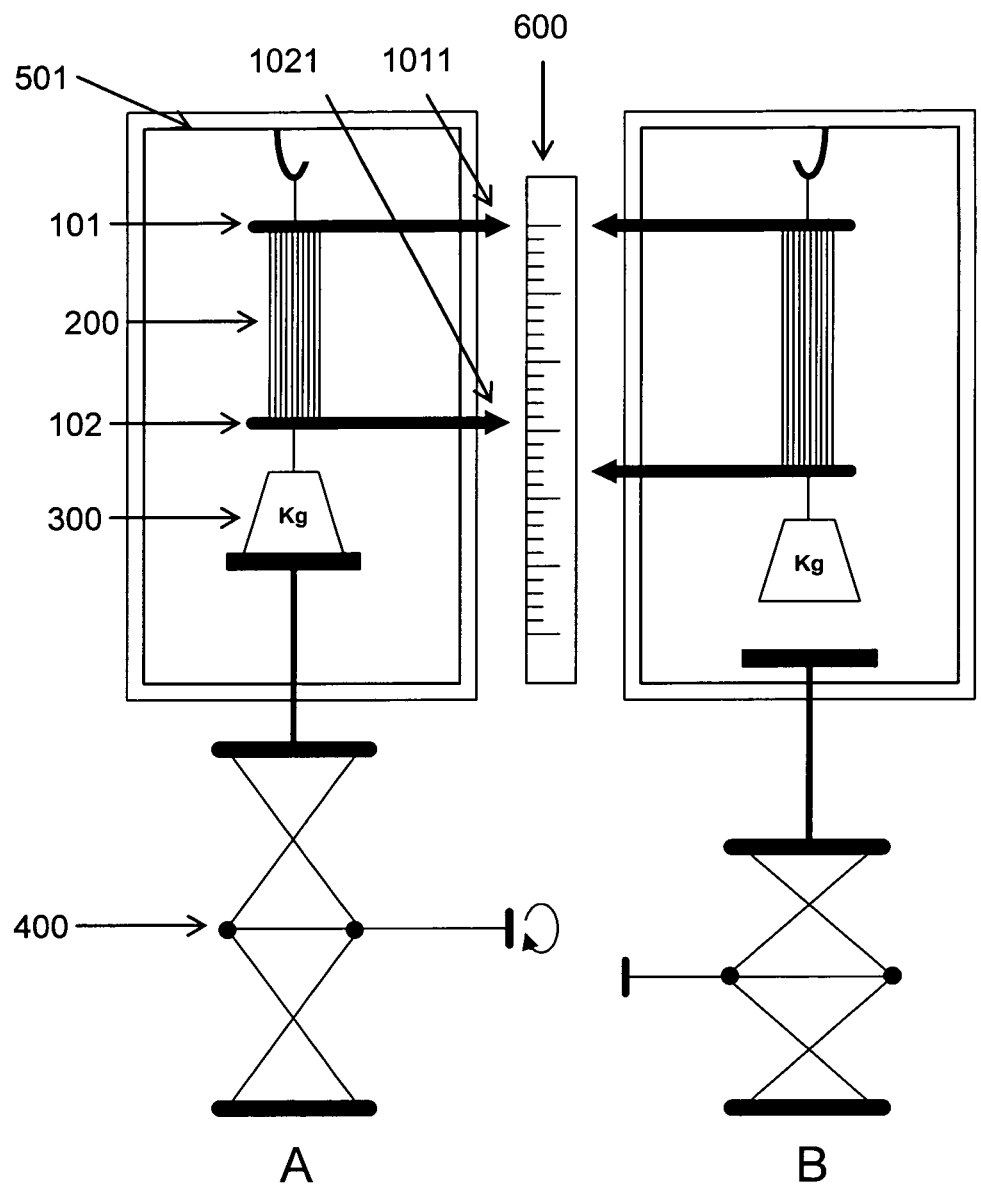
FIG. 2 is a schematic representation of the device used for creep measurements. The illustrations (1) and (2) represent an instance of the yarn length (200) at the beginning of the experiment and an instance of the elongated yarn after a certain time t, respectively.

Creep tests were performed with a device as schematically represented in FIG. 2, on untwined yarn samples, i.e. yarn with substantially parallel filaments, of about 1500 mm length, having a titer of about 504 dtex and consisting of 64 filaments.

The yarn samples were slip-free clamped between two clamps (101) and (102) by winding each of the yarn's ends several times around the axes of the clamps and then knotting the free ends of the yarn to the yarn's body. The final length of the yarn between the clamps (200) was about 180 mm.

The clamped yarn sample was placed in a temperature-controlled chamber (500) at a temperature of 70° C. by attaching one of the clamps to the sealing of the chamber (501) and the other clamp to a counterweight (300) of 3162 g resulting in a load of 600 MPa on the yarn. The position of the clamp (101) and that of clamp (102) can be read on the scale (600) marked off in centimeters and with subdivisions in mm with the help of the indicators (1011) and (1021).

Special care was taken when placing the yarn inside said chamber to ensure that the segment of the yarn between the clamps does not touch any components of the device, so that the experiment can run fully friction free.

An elevator (400) underneath the counterweight was used to raise the counterweight to an initial position whereat no slackening of the yarn occurs and no initial load is applied to the yarn. The initial position of the counterweight is the position wherein the length of the yarn (200) equals the distance between (101) and (102) as measured on (600).

The yarn was subsequently preloaded with the full load of 600 MPa during 10 seconds by lowering the elevator, after which the load was removed by raising again the elevator to the initial position. The yarn was subsequently allowed to relax for a period of 10 times the preloading time, i.e. 100 seconds.

After the preloading sequence, the full load was applied again. The elongation of the yarn in time was followed on the scale (600) by reading the position of the indicator (1021). The time needed for said indicator to advance 1 mm was recorded for each elongation of 1 mm until the yarn broke.

The elongation of the yarn $\varepsilon_i$ [in mm] at a certain time t is herein understood the difference between the length of the yarn between the clamps at that time t, i.e. L(t), and the initial length (200) of the yarn $L_0$ between the clamps. Therefore:

$$\varepsilon_i(t)[\text{in mm}] = L(t) - L_0$$

The elongation of the yarn [in percentages] is:

$$\varepsilon_i(t)[\text{in \%}] = \frac{L(t) - L_0}{L_0} \times 100$$

The creep rate [in 1/s] is defined as the change in yarn's length per time step and was determined according to Formula (2) as:

$$\dot{\varepsilon}_i = \frac{\varepsilon_i - \varepsilon_{i-1}}{t_i - t_{i-1}} \times \frac{1}{100} \qquad (2)$$

wherein $\varepsilon_i$ and $\varepsilon_{i-1}$ are the elongations [in %] at moment i and at the previous moment i−1; and $t_i$ and $t_{i-1}$ are the time (in seconds) needed for the yarn to reach the elongations $\varepsilon_i$ and $\varepsilon_{i-1}$, respectively.

The creep rate [1/s] was then plotted on a logarithmic scale vs. the elongation in percentage [%]. An example of such a recorded plot characteristic to a gelspun UHMWPE yarn is shown in FIG. 3.

Figure 3:
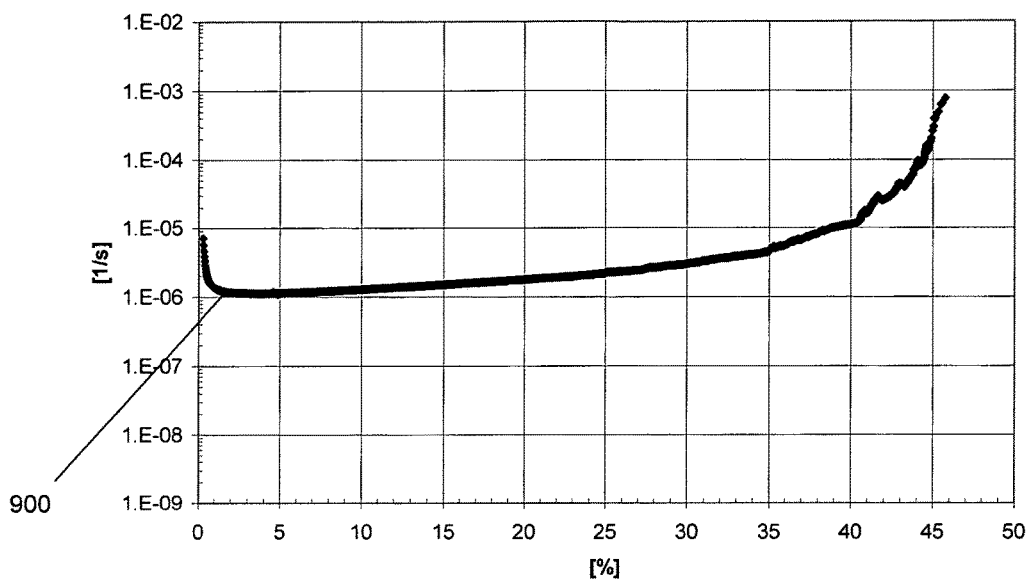
FIG. 3 shows a plot of the creep rate [1/s] on a logarithmic scale vs. the elongation in percentage [%] characteristic to a measured yarn.

The minimum (e.g. (900) in FIG. 3) of the plot was then used as the creep rate value characteristic to the investigated yarn.

EXAMPLE AND COMPARATIVE EXPERIMENT

Example

A high density polyethylene (HDPE) pipe of 8" diameter, 5 mm wall thickness and 1.5 m length was reinforced with a member in the form of a liner consisting of yarns of first type and second type by winding the liner around the pipe under an angle of about 54.7° with respect to the axial direction of the pipe. The pipe was pressurized at a pressure of 25% of bursting pressure.

The yarns of first type were manufactured from an aromatic copolyamide prepared from terephthaloyl chloride and equimolar proportions of p-phenylenediamine and 3,4'-diaminodiphenylether. Such yarns are commercially available under the name Technora® being produced by Teijin. The yarns had a titer of 1670 dtex, a fracture strain of 4.6% and a strength of 24.7 cN/dtex.

The yarns of second type were HPPE yarns manufactured from UHMWPE by a gel spinning technique. Such yarns are commercially available under the name Dyneema®SK75 being produced by DSM Dyneema, the Netherlands. The yarns had a titer of 1760 dtex, a fracture strain of 3.5% and a strength of 35.1 cN/dtex.

An equal number of yarns of first and second type was used, the mass % of yarns is of first type being 48.7 and of the second type 51.3.

The efficiency of the pipe was 130%, where 100% corresponds to the initial burst strength.

Comparative Experiment

Example was repeated but the liner consisted of only Technora® yarns.

The efficiency of the pipe was 90%.

It can be seen from the above experimental data that the efficiency of a pressure vessel comprising a member according to the invention increases in time whereas the efficiency of a known pressure vessel always decreases with time. Therefore, a pressure vessel of the invention has an increased safety factor and most surprisingly, the safety factor increases with time.

The invention claimed is:

1. A reinforcing member comprising first and second types of load-bearing yarns, wherein
the first type of load-bearing yarns have a creep rate $\dot{\varepsilon}_1$ and are comprised of a first type of continuous filaments, and wherein
the second type of load-bearing yarns have a creep rate $\dot{\varepsilon}_2$ and are comprised of a second type of continuous filaments, and wherein
the creep rate $\dot{\varepsilon}_2$ of the second type of load-bearing yarns is at least 10 times higher than the creep rate $\dot{\varepsilon}_1$ of the first type of load-bearing yarns to thereby satisfy a relationship:

$\dot{\varepsilon}_2 \geq 10 \times \dot{\varepsilon}_1$ wherein the creep rates $\dot{\varepsilon}_1$ and $\dot{\varepsilon}_2$ are measured on the first and second types of load-bearing yarns, respectively, at a temperature of 20° C. and under an applied load of 600 MPa.

2. The reinforcing member of claim 1, wherein the first type of load-bearing yarns are polymeric yarns.

3. The reinforcing member of claim 1, wherein the second type of load-bearing yarns are polymeric yarns.

4. The reinforcing member of claim 1, wherein the creep rate $\dot{\varepsilon}_2$ is at least 30 times higher than the creep rate $\dot{\varepsilon}_1$.

5. The reinforcing member of claim 1 wherein the creep rate $\dot{\varepsilon}_2$ is at least $10^{-9}$ sec$^{-1}$ and the creep rate $\dot{\varepsilon}_1$ is at most $10^{-8}$ sec$^{-1}$.

6. The reinforcing member of claim 1, wherein the first type of load-bearing yarns have a fracture strain $F_1$, and the second type of load-bearing yarns have a fracture strain $F_2$, and wherein a ratio $F_1/F_2$ is between 1.1 and 6.

7. The reinforcing member of claim 1, wherein the first type of load-bearing yarns are manufactured from aromatic copolyamide prepared from terephthaloyl chloride and equimolar proportions of p-phenylenediamine and 3,4'-diaminodiphenylether, and the second type of load-bearing yarns are manufactured from ultra high molecular weight polyethylene (UHMWPE).

8. The reinforcing member of claim 1 wherein the first type of load-bearing yarns contained by the member are present in the member in a mass % amount of between 20% and 80% based on total mass of the first and second types of load-bearing yarns.

9. The reinforcing member of claim 1 further comprising a resin.

10. The reinforcing member according to claim 1 wherein the member is a liner.

11. The reinforcing member of claim 1, wherein each of the first and second types of load-bearing yarns have a linear configuration.

12. The reinforcing member of claim 1, wherein the second load-bearing yarns elongate by creep under a tension force at which strain induced in the first type of load-bearing yarns is about equal to fracture strain of the first type of load-bearing yarns.

13. A pressure vessel comprising the member of claim 1.

14. A pressure vessel having a vessel wall reinforced with the member of claim 1, wherein the second type of load-bearing yarns are elongated by creep under a stress induced by deformation of the vessel wall achieved by pressurizing the vessel at a pressure of at most a pressure at which strain induced in the first type of load-bearing yarns is about equal to fracture strain of the first type of load-bearing yarns.

15. The pressure vessel of claim 11, wherein the pressure vessel is a pipe.

16. An article comprising a member according to claim 1, wherein the article is selected from the group consisting of a rope, a suture, a cable, a sling, a composite, a liner, and a chain construction.

17. The article of claim 16, wherein the member increases efficiency of the article to above 100%.

* * * * *